(12) United States Patent
Teranishi

(10) Patent No.: US 6,590,736 B2
(45) Date of Patent: Jul. 8, 2003

(54) TAPE OR DISC RECORD PLAYER EQUIPPED WITH STANDBY POWER-SAVING MEANS

(75) Inventor: Norihisa Teranishi, Takefu (JP)

(73) Assignee: Orion Electric Co., Ltd., Fukui (JP)

( * ) Notice: Subject to any disclaimer, the term of this patent is extended or adjusted under 35 U.S.C. 154(b) by 182 days.

(21) Appl. No.: 09/834,930

(22) Filed: Apr. 16, 2001

(65) Prior Publication Data
US 2001/0030925 A1 Oct. 18, 2001

(30) Foreign Application Priority Data
Apr. 17, 2000 (JP) ........................................ 2000-114836

(51) Int. Cl.$^7$ .............................................. G11B 21/02
(52) U.S. Cl. ...................... 360/85; 369/75.2; 360/99.07
(58) Field of Search ............................... 360/85, 99.03, 360/86, 99.07, 137; 369/75.2, 77.2

(56) References Cited
U.S. PATENT DOCUMENTS 3,732,477 A  *  5/1973  Cicatelli ..................... 318/463
3,732,546 A  *  5/1973  Ronkin et al. ................. 360/70
4,318,139 A  *  3/1982  Shibata et al. ................. 360/71
4,413,291 A  * 11/1983  Ueki et al. ..................... 360/71
4,445,210 A  *  4/1984  Adachi ........................ 369/230
5,198,733 A  *  3/1993  Wright ........................ 318/254
5,841,752 A  * 11/1998  Ohmori et al. ............. 369/75.2
6,236,527 B1 *  5/2001  Uchiike et al. ............... 360/75

* cited by examiner

Primary Examiner—Brian E. Miller
(74) Attorney, Agent, or Firm—Wenderoth, Lind & Ponack, L.L.P.

(57) ABSTRACT

Disclosed is an improvement in a record player for turning the information stored on a cassette tape or a compact disc back into the original forms including a recording medium loading mechanism and an associated loading motor. It comprises means responsive to insertion of the recording medium for rotating the loading motor, thereby allowing it to generate the counter electromotive force, and a detection-switching device responsive to generation of the counter electromotive force for changing its conductive condition. Then, the loading motor is allowed to start and pull in the cassette or compact disk until it has been put in the loading position.

5 Claims, 4 Drawing Sheets

TAPE OR DISC RECORD PLAYER EQUIPPED WITH STANDBY POWER-SAVING MEANS

BACKGROUND OF THE INVENTION

1. Field of the Invention

The present invention relates to a magnetic record or compact disc player equipped with a cassette or disc loading mechanism, and particularly to such a record player equipped with power-saving means on standby.

2. Related Arts

In the standby power-saving mode, the power-supply switch turns off, and the magnetic record player is loaded with no cassette. In such standby power-saving mode, however, the mode sensor is kept energized by feeding it with electricity, thereby enabling it to detect insertion of a cassette and start the loading of the cassette immediately when detected. This is the case with the disc player.

The magnetic record player, therefore, consumes electric power to keep the mode sensor alive even in the standby power-saving mode. With a view to saving such electric power, a magnetic record player is designed to use a mechanical detection system, which is operatively connected to the cassette-loading mechanism via an associated cassette-loading detection switch. The cassette-loading detection switch can turn on in response to insertion of the cassette in the magnetic record player.

SUMMARY OF THE INVENTION

One object of the present invention is to provide a magnetic record or compact disc player equipped with a cassette or disc loading mechanism, not requiring the continuous supply of electric power to the detection sensor in the standby power-saving mode, thus saving the electric power by using the minimum possible that will allow the system control computer to keep the timer alive and detect insertion of the cassette or disk.

To attain this object a record player for turning the information stored on a cassette tape or a compact disc back into the original forms comprising a recording medium loading mechanism and an associated loading motor, is improved according to the present invention in that it further comprises means responsive to insertion of the recording medium for rotating the loading motor, thereby allowing it to generate the counter electromotive force, and a detection switching device responsive to generation of the counter electromotive force for switching its conductive condition.

The record player further comprises a system control computer to which the detection-switching device is connected.

The system control computer may be responsive to the change in the conductive condition in the switching device for switching its standby power-saving mode to its operating mode or vice versa.

The detection switching device may comprise a transistor and a resistor, the transistor having its collector electrode connected to a predetermined voltage source, and its base electrode connected to the loading motor, thus allowing the loading motor to apply its counter electromotive force to the base electrode of the transistor.

The system control computer may be responsive to the change in the conductive condition in the switching device for switching the record player from its standby power-saving mode to its operating mode or vice versa.

A record player for turning the information stored on a cassette tape or a compact disc back into the original forms comprising a recording medium loading mechanism and an associated loading motor, is improved according to the present invention in that it further comprises a gang of gears-and-slidable holder responsive to insertion of the recording medium for rotating the loading motor, thereby allowing it to generate the counter electromotive force; a detection switching transistor responsive to generation of the counter electromotive force for changing its conductive condition; and a system control computer connected to the detection switching transistor, the transistor having its collector electrode connected to a predetermined voltage source via an associated resistor, and its base electrode connected to the loading motor, thus allowing the loading motor to apply its counter electromotive force to the base electrode of the transistor, thereby changing its conductive condition.

With this arrangement, insertion of a cassette or compact disc in the record player in the standby power-saving mode rotates a gang of gears associated with the loading mechanism to rotate the loading motor. Then, the loading motor works as a generator, causing a counter electromotive force to appear between its opposite terminals. The counter electromotive force is applied to the base electrode of the switching transistor, thus lowering the collector potential toward the ground to inform the system control computer of insertion of the cassette. Then, the system control computer permits the record player to change from the standby power-saving mode to the working mode, permitting the loading motor drive IC to start the loading motor, thus pulling the cassette inward. The mode sensor is informed of the changing of the record player to the working mode, determining the position in which the cassette is now put. Then, the loading motor starts to pull the cassette inward until it has been put in the loading position.

The above is the case with the compact disc player.

Other objects and advantages of the present invention will be understood from the following description of a magnetic record player according to one preferred embodiment of the present invention, which is shown in accompanying drawings.

DETAILED DESCRIPTION OF PREFERRED EMBODIMENT

Figure 1:
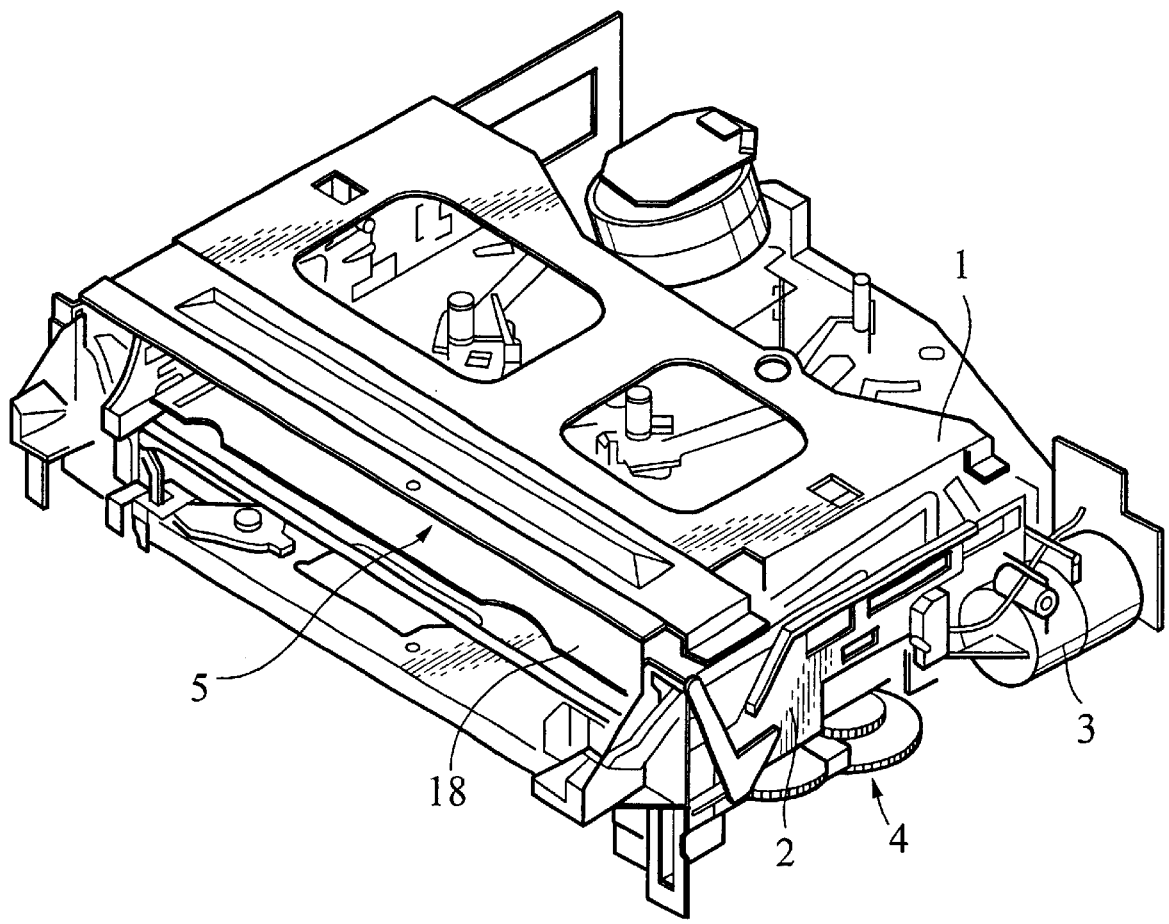
FIG. 1 is a perspective view of the cassette player according to the present invention.

Referring to FIG. 1, a record player for playback of information stored on a cassette tape or a compact disc comprises a frame 1, a cassette-carrying holder 18, a composite rack 2 fixed to one side of the frame 1 and operatively connected to the holder 18, a cassette-loading motor 3, a gang of gears 4 and other parts. A cassette can be inserted from the cassette inlet 5 into the holder 18 so that the record player may be loaded with the cassette in place. Specifically, insertion of the cassette causes the composite rack 2 to slide, rotating the cassette-loading motor 3 via the gang of gears 4.

Figure 2A:
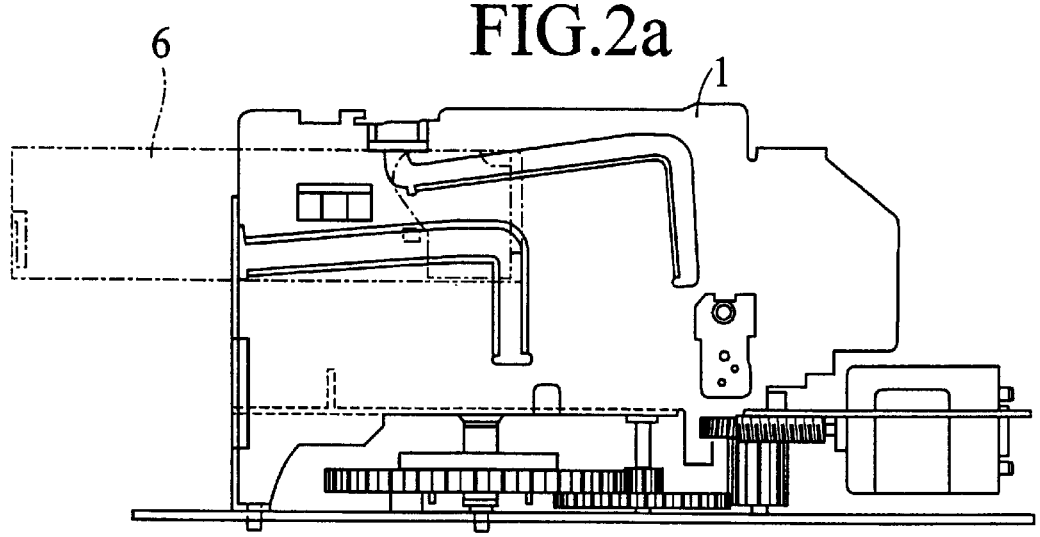
FIG. 2 shows how the cassette player is loaded with a cassette.
Figure 2B:
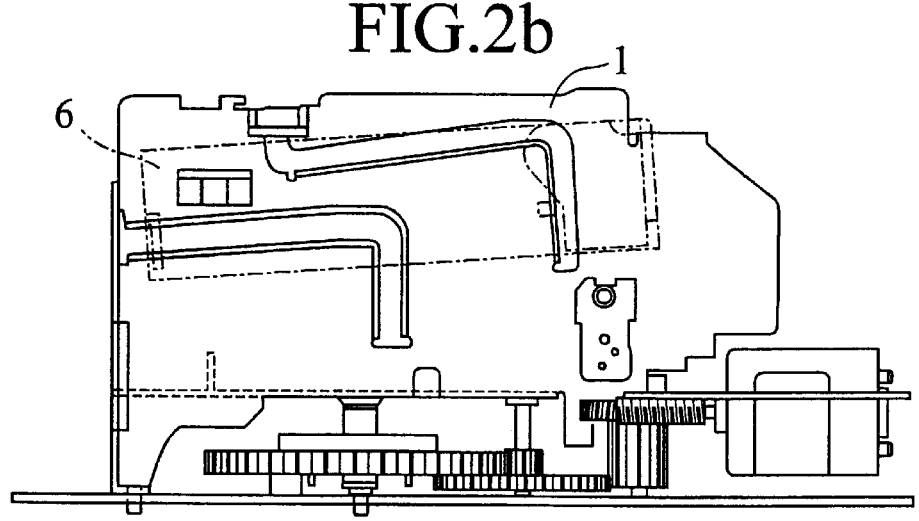
Figure 2C:
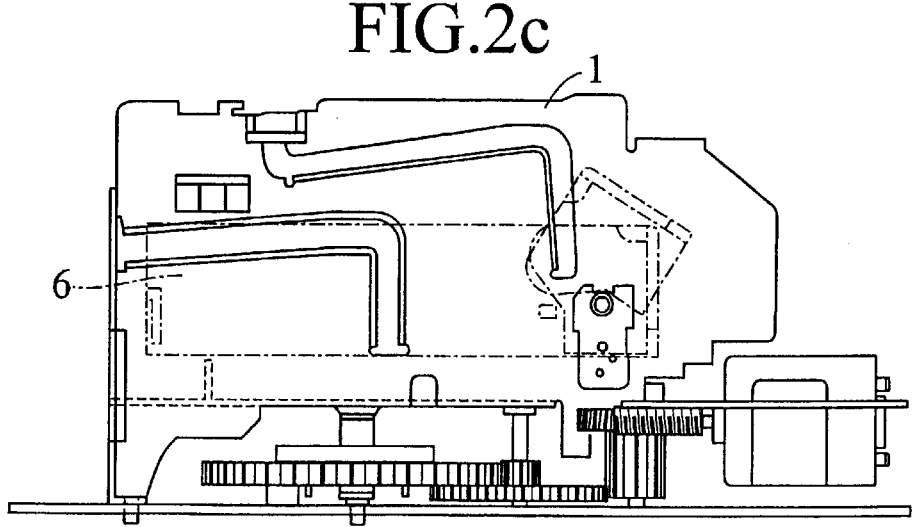

Then, the cassette-loading motor 3 works as a generator, generating a counter electromotive force. FIGS. 2 (*a*), 2(*b*) and 2(*c*) show how the cassette is being inserted in the record player, causing the cassette-loading motor 3 to start when the cassette reaches a certain position on the way to the final loading position, and then the cassette-loading motor drives the cassette until it has put the cassette in the final loading position.

Figure 3:
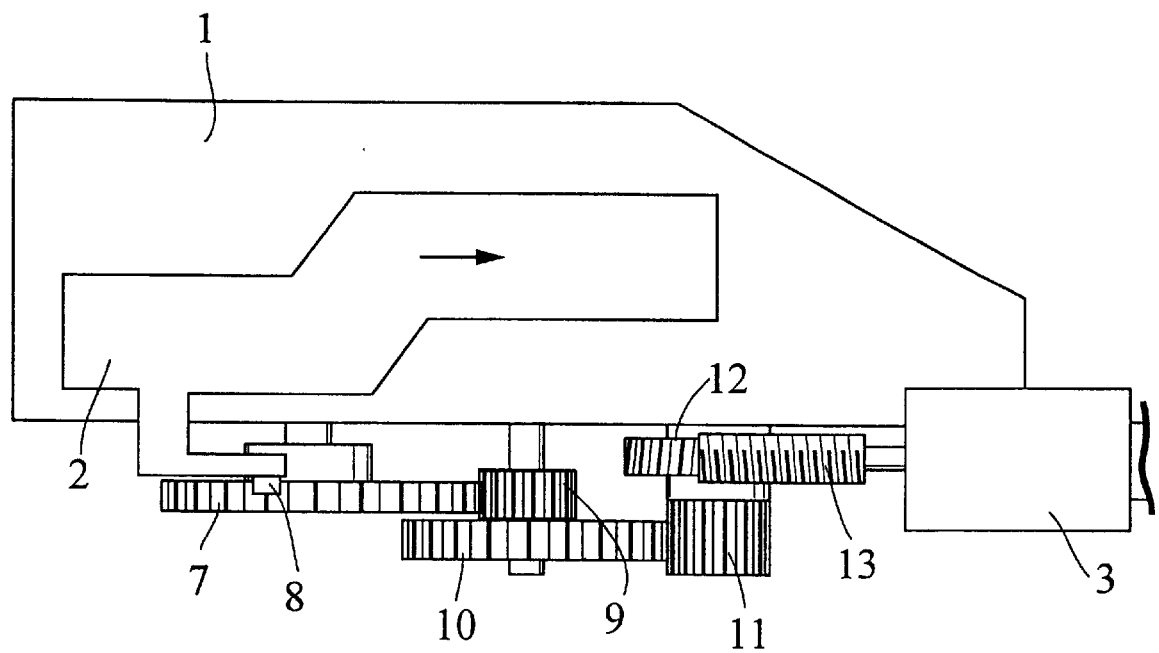
FIG. 3 is a side sectional view of the cassette player of FIG. 1.

Referring to FIG. 3, the composite rack 2 is operatively connected to the cassette-loading motor 3 via the gang of gears 7. The composite rack 2 is slidably fixed to the frame 1, and insertion of the cassette 6 into the holder 18 will drive the cassette-and-holder rightward by the mechanism which cooperates with the holder 18. The composite rack 2 has a pin 8 projecting therefrom to engage with a selected gear 7 of the gang of gears. Movement of the composite rack 2 will rotate the gear 7.

As seen from the drawing, the gear 7 meshes with a subsequent gear 9, which is integrally connected to a large gear 10. The large gear 10, in turn, meshes with a subsequent gear 11, which is integrally connected to a worm gear 12. Finally the worm gear 12 meshes with the screw shaft 13 of the cassette-loading motor 3.

The gang of gears 7, 9, 10—increases the rotating speed of the gear 7 in transmitting the torque to the cassette-loading motor 3, thus driving the cassette-loading motor at an increased speed. The so described gang of gears 4 is a mere example of gearing, and it should not be understood as being limitative.

Figure 4:
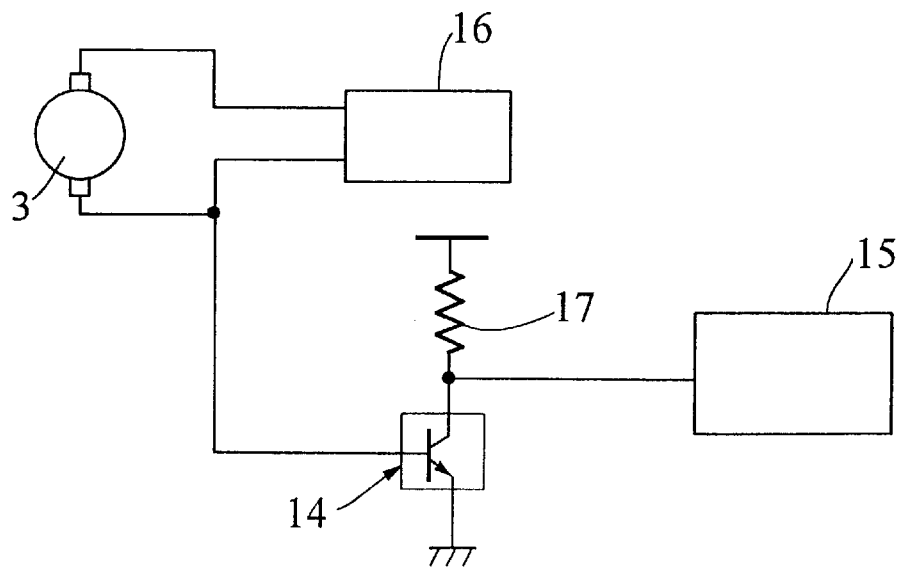
FIG. 4 shows a cassette-loading detection switching device.

With this arrangement insertion of the cassette 6 causes the cassette-loading motor 3 to rotate via the gang of gears 4, thus making the cassette-loading motor 3 generate a counter electromotive force. Referring to FIG. 4, the counter electromotive force is applied to the base electrode of the switching transistor 14, thereby lowering the collector potential toward the ground potential.

Specifically five volts are applied both to a system control computer 15 and the collector electrode of the switching transistor 14 via an associated resistor 17, and the system control computer 16 realizes the switching-off from the appearance of five volts at the collector electrode of the transistor. Application of the counter electromotive force to the base electrode of the transistor will provide a conductive channel between the collector electrode and the emitter electrode, thus pulling the collector potential down to the ground potential, which is detected by the system control computer 15. Then, the system control computer 15 sends a start signal to the cassette-loading motor 3 for starting.

When the cassette-loading motor 3 starts, the cassette 6 is pulled in to be put in the loading position, in which the recording/playing of the cassette is permitted. When the recording/playing ends, the cassette ejection is ordered to permit the cassette-loading mechanism to eject the cassette. Referring to FIG. 2, the cassette-loading motor 3 generates the counter electromotive force while the cassette is on the course from insertion to the position as shown in FIG. 2(*a*), thus making the transistor switching device 14 turn on. Then, in response to the signal from the transistor-switching device 14 the system control computer 15 instructs the motor drive IC to start the cassette-loading motor 3. The cassette-loading motor 3 drives the cassette from the starting position (see FIG. 2(*a*)) to the loading position (see FIG. 2(*c*)) via the intermediate position (see FIG. 2(*b*)).

Figure 5:
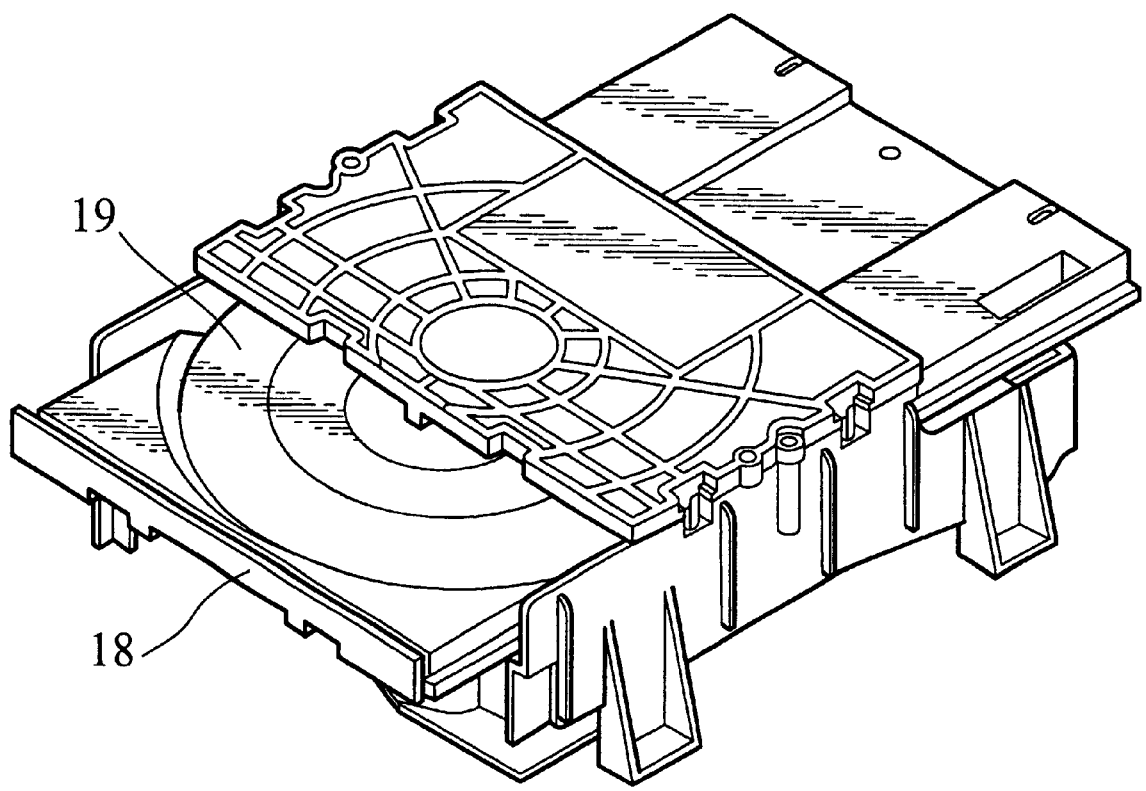
FIG. 5 is a perspective view of the compact disc player.

FIG. 5 shows a disc player according to the present invention, which is constructed in the same way as described above. A compact disk is put on the carrier table 19, which is pulled out from the casing. The pushing-in of the carrier table 19 into the casing will make the disc-loading motor turn, thereby generating a counter electromotive force.

As may be understood from the above a cassette or disk player according to the present invention can save significantly the quantity of electric power consumed in the standby mode, in which a minimum quantity of electric power is required for keeping the timer alive and for detecting insertion of a cassette or compact disk by the system control computer. The mechanism responsive to insertion of a cassette or compact disk for starting the cassette- or disk-loading motor according to the present invention can be applied to the conventional record player without substantial modification of the software program in the system control computer and other parts.

What is claimed is:

1. A record player for use in playback of information stored on a cassette tape or a compact disc, said record player comprising: a recording medium loading mechanism; a loading motor; a mechanism responsive to insertion of a recording medium into the loading mechanism for rotating the loading motor and thereby causing the loading motor to generate a counter electromotive force; and a detection-switching device comprising a transistor and a resistor, the transistor having a collector electrode connected to a predetermined voltage source, and a base electrode connected to the loading motor, thus allowing the loading motor to apply the counter electromotive force to the base electrode of the transistor to generate a signal indicating that the recording medium has been inserted into the loading mechanism.

2. A record player according to claim 1, further comprising a system control computer to which the detection-switching device is connected.

3. A record player according to claim 2, wherein the system control computer is responsive to said signal for changing from a standby power-saving mode to an operating mode or vice versa.

4. A record player for use in playback of information stored on a cassette tape or a compact disc, said record player comprising: a recording medium loading mechanism; a loading motor; a gang of gears and a slidable holder responsive to insertion of a recording medium into the loading mechanism for rotating the loading motor and thereby causing the loading motor to generate a counter electromotive force; a detection-switching transistor; and a system control computer connected to the detection-switching transistor, the transistor having a collector electrode connected to a predetermined voltage source via an associated resistor, and a base electrode connected to the loading motor, thus allowing the loading motor to apply the counter electromotive force to the base electrode of the transistor to thereby generate a signal indicating that the recording medium has been inserted into the loading mechanism.

5. A record player according to claim 4, wherein the system control computer is responsive to said signal for changing from a standby power-saving mode to an operating mode or vice versa.

* * * * *